US010805602B2

(12) United States Patent
Vilermo et al.

(10) Patent No.: US 10,805,602 B2
(45) Date of Patent: Oct. 13, 2020

(54) METHOD AND APPARATUS FOR CALIBRATING AN AUDIO PLAYBACK SYSTEM

(71) Applicant: NOKIA TECHNOLOGIES OY, Espoo (FI)

(72) Inventors: Miikka Tapani Vilermo, Siuro (FI); Arto Juhani Lehtiniemi, Lempaala (FI); Mikko Tapio Tammi, Tampere (FI); Lasse Juhani Laaksonen, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/212,353

(22) Filed: Jul. 18, 2016

(65) Prior Publication Data

US 2017/0013258 A1    Jan. 12, 2017

Related U.S. Application Data

(63) Continuation of application No. 14/084,108, filed on Nov. 19, 2013, now Pat. No. 9,402,095.

(51) Int. Cl.
*G06F 17/00* (2006.01)
*H04S 7/00* (2006.01)
(Continued)

(52) U.S. Cl.
CPC ............. *H04N 17/00* (2013.01); *H04N 5/607* (2013.01); *H04N 21/4223* (2013.01);
(Continued)

(58) Field of Classification Search
CPC . H04S 7/40; H04S 7/301; H04S 7/302; H04S 7/303; H04S 7/304; H04S 1/002; H04S 7/00; H04S 7/30; H04R 29/008
See application file for complete search history.

(56) References Cited

U.S. PATENT DOCUMENTS 9,402,095 B2 *    7/2016   Vilermo ................. H04S 7/302
2006/0125968 A1    6/2006   Yokozawa et al.
(Continued)

FOREIGN PATENT DOCUMENTS

EP    2 031 905 A2    3/2009
EP    2 293 603 A1    3/2011
(Continued)

OTHER PUBLICATIONS

Craven, P. G., *Continuous Surround Panning for 5-speaker Reproduction*, in AES 24th International Conference on Multichannel Audio (Jun. 2003) 6 pages.
(Continued)

*Primary Examiner* — Andrew C Flanders
(74) *Attorney, Agent, or Firm* — Alston & Bird LLP

(57) ABSTRACT

A method, apparatus and computer program product are provided to facilitate calibration of an audio playback system with a video presented upon a display. In the context of a method, information about a display from a first location is received. The method also includes determining an angle of the display based upon the received information about the display and the first location. The method further includes causing an audio playback system associated with the display to be calibrated based upon a modified azimuth of a source of audio signals based upon the determined angle. A corresponding apparatus and computer program product are also provided.

18 Claims, 11 Drawing Sheets

(51) Int. Cl.
H04N 21/4223 (2011.01)
H04N 17/00 (2006.01)
H04N 21/439 (2011.01)
H04N 21/442 (2011.01)
H04N 5/60 (2006.01)

(52) U.S. Cl.
CPC ..... *H04N 21/439* (2013.01); *H04N 21/44218* (2013.01); *H04S 7/302* (2013.01); *H04N 2017/006* (2013.01); *H04S 2400/11* (2013.01)

(56) References Cited

U.S. PATENT DOCUMENTS

| | | | |
|---|---|---|---|
| 2006/0280312 A1* | 12/2006 | Mao | G10L 21/0208 381/56 |
| 2008/0007654 A1 | 1/2008 | Ryu et al. | |
| 2010/0033427 A1* | 2/2010 | Marks | H04N 13/10 345/156 |
| 2010/0329489 A1 | 12/2010 | Karaoguz | |
| 2011/0164769 A1* | 7/2011 | Zhan | G10L 19/008 381/1 |
| 2011/0280437 A1* | 11/2011 | Rodriguez | G06F 3/011 382/100 |
| 2012/0076304 A1* | 3/2012 | Suzuki | H04S 7/30 381/1 |
| 2012/0128184 A1 | 5/2012 | Kim et al. | |
| 2012/0155703 A1 | 6/2012 | Hernandez-Abrego et al. | |
| 2012/0163606 A1* | 6/2012 | Eronen | H04S 7/302 381/22 |
| 2012/0281128 A1 | 11/2012 | Shintani | |
| 2013/0216072 A1 | 8/2013 | Freeman | |
| 2015/0138370 A1 | 5/2015 | Vilermo et al. | |
| 2016/0105757 A1* | 4/2016 | Vennstronn; Anders | G06F 3/167 381/303 |

FOREIGN PATENT DOCUMENTS

| | | |
|---|---|---|
| EP | 2 434 783 A1 | 3/2012 |
| EP | 2 551 763 A1 | 1/2013 |
| IN | 00346CH2013 | 6/2013 |
| KR | 101164915 B1 | 7/2012 |

OTHER PUBLICATIONS

Kim, S. et al., *Adaptive Virtual Surround Sound Rendering Method for an Arbitrary Listening Position*, 30$^{th}$ AES Conference: Intelligent Audio Environments (Mar. 2007), 9 pages.

Ming, X. et al., *A Novel Method of Multi-view Virtual Image Synthesis for Auto-stereoscopic Display*, Advances in Intelligent and Soft Computing, vol. 163 (2012) pp. 865-873.

Poletti, M., *An Investigation of 2D Multizone Surround Souns Systems*, 125 AES Convention Paper 7551 (Oct. 2008) 9 pages.

Sadek, R. et al., *A Novel Multichannel Panning Method for Standard and Arbitrary Loudspeaker Configures*, 117 AES Convention Paper 6263 (Oct. 2004) 5 pages.

Technology: MCACC—Amplifier, AV Receiver [online] [retrieved Nov. 27, 2013]. Retrieved from the Internet: <URL: http://www.pioneer.eu/eur/products/42/98/tech/AVAmplifierReceiver/AF_MCACC.html>. (undated), 1 page.

Ultrasonic Sensor-Based personalized Multichannel Audio Rendering for Multiview Broadcasting Services [online] [retrieved Aug. 28, 2013]. Retrieved from the Internet: <URL: http://www.hindawi.com/journals/ijdsn/2013/417574/abs/>. (dated Nov. 11, 2012) 1 page.

AutoCal—Fast, easy and consistent acoustic self-calibration [online] [retrieved Nov. 27, 2013]. Retrieved from the Internet: <URL: http://www.genelec.com/learning-center/key-technologies/dsp-monitoring-systems/autocal/>. (undated) 2 pages.

MultEQ | Audyssey [online] [retrieved Dec. 3, 2013]. Retrieved from the Internet: <URL: http://www.audyssey-com/audio-technologymulteq>. (dated 2013) 2 pages.

Audio & Visual—Yamaha—Asia / Middle East / Africa / Oceania / Latin . . . [online] [retrieved Dec. 3, 2013]. Retrieved from the Internet: <URL: http://www.yamaha.co.jp/enlighs/product/av/guide/technologies/etou/etoul.html >. (dated 2013) 3 pages.

THX releases iOS app for calibrating your home theater's visuals and audio [online] [retrieved Dec. 3, 2013]. Retrieved from the Internet: <URL: http://www.engadget.com/2013/01/30/thx-tune-up-calibration-app-ios/>. (dated Jan. 2013) 7 pages.

HDTV Set Up « THX.com [online] [retrieved Dec. 3, 2013]. Retrieved from the Internet: <URL: http://www.thx.com/consumer/home-entertainment/home-theater/hdtv-set-up/>. (dated 2013) 5 pages.

Interpupillary distance—Wikipedia, the free encyclopedia [online] [retrieved Dec. 3, 2013]. Retrieved from the Internet: <URL: http://en.wikipedia.org/wiki?interpupillary_distance>. (dated Apr. 2013) 3 pages.

Audio Spotlight—Add sound and preserve the quiet. [online] [retrieved Dec. 3, 2013]. Retrieved from the Internet: <URL: http://www.holosonics.com>. (dated 1999-2009) 3 pages.

How to Guides [online] [retrieved Dec. 3, 2013]. Retrieved from the Internet: <URL: http://www.digitaltrends.com/home-theater/home-theater-calibration-guide-manual-speaker-setup/>. (dated Apr. 14, 2011) 6 pages.

Home theater calibration guide: Manual speaker setup | p. 2 | Digital Trends [online] [retrieved Dec. 3, 2013]. Retrieved from the Internet: <URL: http://www.digitaltrends.com/home-theater/home-theater-calibration-guide-manual-speaker-setup/>. (dated Apr. 14, 2011) 4 pages.

Automatic speaker calibration technologies (MCACC, YPAO, Audyssey . . . [online] [retrieved Dec. 30, 2013]. Retrieved from the Internet: <URL: http://www.eclecticelectronics.net/ht-home-theater/automatic-speaker-calibration-technologies-mcacc-ypao-audyssey-multeq/>. (located via WayBack Machine http://web.archive.org/web/20090119161903/http://www.eclecticelectron . . . > (as early as Jan 2009).

Extended European Search Report from European Patent Application No. 14190787.3 dated Mar. 18, 2015.

Office Action for U.S. Appl. No. 14/084,108 dated Aug. 25, 2015.

Notice of Allowance for U.S. Appl. No. 14/084,108 dated Apr. 1, 2016.

Notice of Allowance for U.S. Appl. No. 14/084,108 dated Apr. 28, 2016.

Decision to Grant for European Application No. 14 190 787.3 dated Jul. 28, 2016.

Extended European Search Report from European Patent Application No. 16176997.1 dated Oct. 6, 2016, 8 pages.

Office Action for European Patent Application No. 16176997.1 dated Jul. 21, 2017, 7 pages.

* cited by examiner

METHOD AND APPARATUS FOR CALIBRATING AN AUDIO PLAYBACK SYSTEM

CROSS REFERENCE TO RELATED APPLICATIONS

This application is a continuation of U.S. application Ser. No. 14/084,108, filed Nov. 19, 2013, the entire contents of which are incorporated herein by reference.

TECHNOLOGICAL FIELD

An example embodiment of the present invention relates generally to a method and apparatus for audio and video playback and, more particularly, to a method, apparatus and computer program product for calibrating an audio playback system.

BACKGROUND

Audio and video playback systems are configured to present an image, such as a video, upon a display and to concurrently cause the audio associated with the video to be output by speakers proximate the display. In order to provide for an enjoyable spatial sound experience, such as in conjunction with a home theater, the audio playback system may not necessarily cause the same audio signals to be output from all of the speakers. Instead, the audio playback system may be configured to cause audio signals to be preferentially output by the speakers positioned in the same relative location as the source of the audio signals in the video presented upon the display. For example, in an instance in which the source of the audio signals is located on the left side of the video, the audio may be preferentially directed to the speaker(s) positioned to the left of the display. Conversely, in an instance in which the source of the audio is located on the right side of the display, the audio may be preferentially directed to the speaker(s) positioned on the right of the display.

In order to provide the desired spatial sound experience, the speakers should be placed in predetermined locations relative to the display. For example, left and right speakers may be positioned equidistance to the left and right, respectively, of the display, and a center speaker may be co-located with the display. In an instance in which the audio playback system is configured to provide surround sound, left and right surround sound speakers may also be positioned behind the location from which the display will be viewed and to the left and the right, respectively, of the display.

However, the speakers are sometimes not placed in the predetermined locations relative to the display. For example, the room in which the display is located may be configured such that the speakers cannot be placed in the predetermined locations. Alternatively, the room in which the display is located may include furniture or other fixtures that prevent the speakers from being positioned in the predetermined locations.

Additionally, an audio playback system is generally configured to create a desired spatial sound experience for a viewer positioned at a particular location relative to the display, such as a viewing location that is centered in front of the display. However, viewers often view a display from different locations, such as locations offset from the display. In these situations, the audio playback system may not provide the desired spatial sound experience. As such, the resulting user experience may be compromised due to sound imbalance, keystoning of the video presented upon the display or other types of distortion.

BRIEF SUMMARY

A method, apparatus and computer program product are provided in accordance with an example embodiment in order to facilitate calibration of an audio playback system, such as with a video presented upon a display. By calibrating the audio playback system, the spatial sound experience may be enhanced and, in some example embodiments, keystoning and other distortions may be reduced, thereby improving the user experience. Moreover, by calibrating the audio playback system, such as with the video presented upon the display, the method, apparatus and computer program product of an example embodiment may permit increased flexibility with respect to the relative locations of the speakers with respect to the display and with respect to the location of the viewer relative to the display, while continuing to provide the desired spatial sound experience.

In an example embodiment, a method is provided that includes receiving an image comprising a display from a first location. The method of this example embodiment also includes determining a dimension of the display within the image and determining an angle of the display based upon the dimension of a display determined within the image and the first location. The method of this example embodiment also includes permitting an audio playback system associated with the display to be calibrated, such as with a video to be presented upon the display, based upon the determined angle.

The method of an example embodiment may permit the audio playback system to be calibrated by causing the angle to be provided to a remote audio processor of the audio playback system to calibrate audio, such as with the video to be presented upon the display. In another example embodiment, the method may permit the audio playback system to be calibrated by determining a measure of calibration and causing the measure of calibration to be provided to a remote audio processor of the audio playback system. In this embodiment, the measure of calibration may be a modified azimuth of an auditory object based upon the angle of the display. In this regard, the modified azimuth may be determined only from one or more auditory objects that contain speech. Alternatively, the measure of calibration may be determined by converting left and right channels of multichannel audio into mid and side channels, modifying the mid and side channels based upon a target audio image with and converting the mid and side channels, as modified, to left and right channels of multichannel audio.

The method of an example embodiment may receive the image by causing the image to be captured by a camera of a mobile device at the first location from which the display will be viewed. The method of an example embodiment may further include determining information regarding keystoning from the image comprising a display and causing the information regarding keystoning to be provided so as to permit modification of the video presented upon the display to reduce the keystoning. The method of an example embodiment may also include determining a center of the display based upon the image comprising the display.

In another example embodiment, an apparatus is provided that includes at least one processor and at least one memory communicatively coupled to the at least one processor with the at least one memory including computer program code for facilitating calibration of an audio playback system. The computer program code, when executed by the at least one processor, is configured to cause the apparatus to at least receive an image comprising a display from the first location. The computer program code, when executed by the at least one processor, is also configured to cause the apparatus of this example embodiment to determine a dimension of the display within the image and to determine an angle of the display based upon the dimension of the display determined within the image and the first location. The computer program code, when executed by the at least one processor, is further configured to cause the apparatus of this example embodiment to permit the audio playback system associated with the display to be calibrated, such as with a video to be presented upon the display, based upon the determined angle.

The computer program code, when executed by the at least one processor, may be configured to cause the apparatus of an example embodiment to permit the audio playback system to be calibrated by causing the angle to be provided to a remote processor of the audio playback system to calibrate audio, such as with the video to be presented upon the display. Alternatively, the computer program code, when executed by the at least one processor, may be configured to cause the apparatus of another example embodiment to permit the audio playback system to be calibrated by determining a measure of calibration and causing the measure of calibration to be provided to a remote audio processor of the audio playback system. In this embodiment, the measure of calibration may be determined by determining a modified azimuth of an auditory object based upon the angle of the display. Alternatively, the measure of calibration may be determined by converting left and right channels of multichannel audio into mid and side channels, modifying the mid and side channels based upon a target audio image with and converting the mid and side channels, as modified, to left and right channels of multichannel audio. The computer program code, when executed by the at least one processor, may be configured to cause the apparatus of an example embodiment to receive the image by causing the image to be captured by a camera of a mobile device at the first location from which the display will be viewed.

In a further example embodiment, a computer program product is provided that includes at least one non-transitory computer-readable storage medium having computer-executable program code portions stored therein with the computer-executable program code portions including program code instructions for receiving an image comprising a display from a first location. The program code portions also include program code instructions for determining a dimension of the display within the image and program code instructions for determining an angle of the display based upon the dimension of the display determined within the image and the first location. The program code portions also include program code instructions for permitting an audio playback system associated with the display to be calibrated, such as with a video to be presented upon the display, based upon the determined angle.

In an example embodiment, the program code instructions for permitting the audio playback system to be calibrated may include program code instructions for causing the angle to be provided to a remote audio processor of the audio playback system to calibrate audio, such as with the video to be presented upon the display. In an alternative embodiment, the program code instructions for permitting the audio playback system to be calibrated may include program code instructions for determining a measure of calibration and program code instructions for causing the measure of calibration to be provided to a remote audio processor of the audio playback system. In this example embodiment, the measure of calibration may be determined by determining a modified azimuth of an auditory object based upon the angle of display. Alternatively, the measure of calibration may be determined by converting left and right channels of multichannel audio into mid and side channels, modifying the mid and side channels based upon a target audio image with and converting the mid and side channels, as modified, to left and right channels of multichannel audio.

In yet another example embodiment, an apparatus is provided that includes means for providing an image comprising a display from the first location. The apparatus of this example embodiment also include means for determining a dimension of the display within the image and means for determining an angle of the display based upon the dimension of the display determined within the image and the first location. The apparatus of this example embodiment also includes means for permitting an audio playback system associated with a display to be calibrated, such as with a video to be presented upon the display, based upon the determined angle.

BRIEF DESCRIPTION OF THE DRAWINGS

Figure 1:
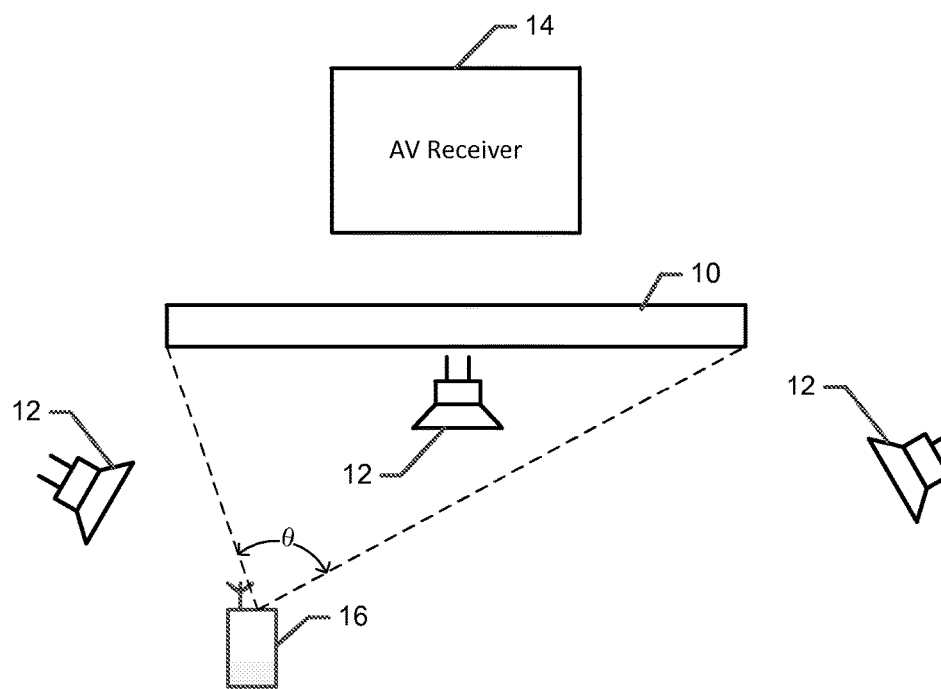
Figure 2:
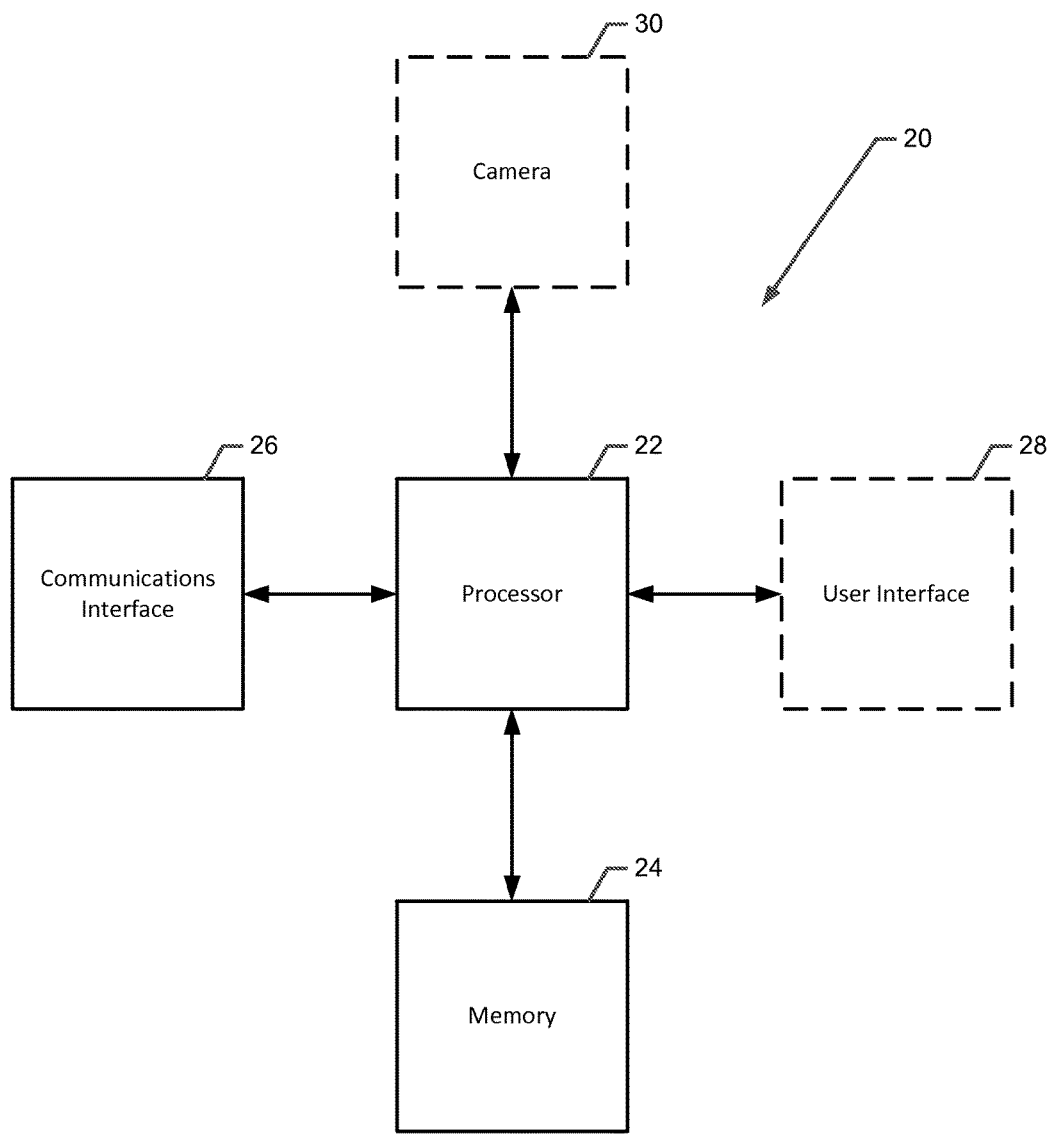
Figure 3:
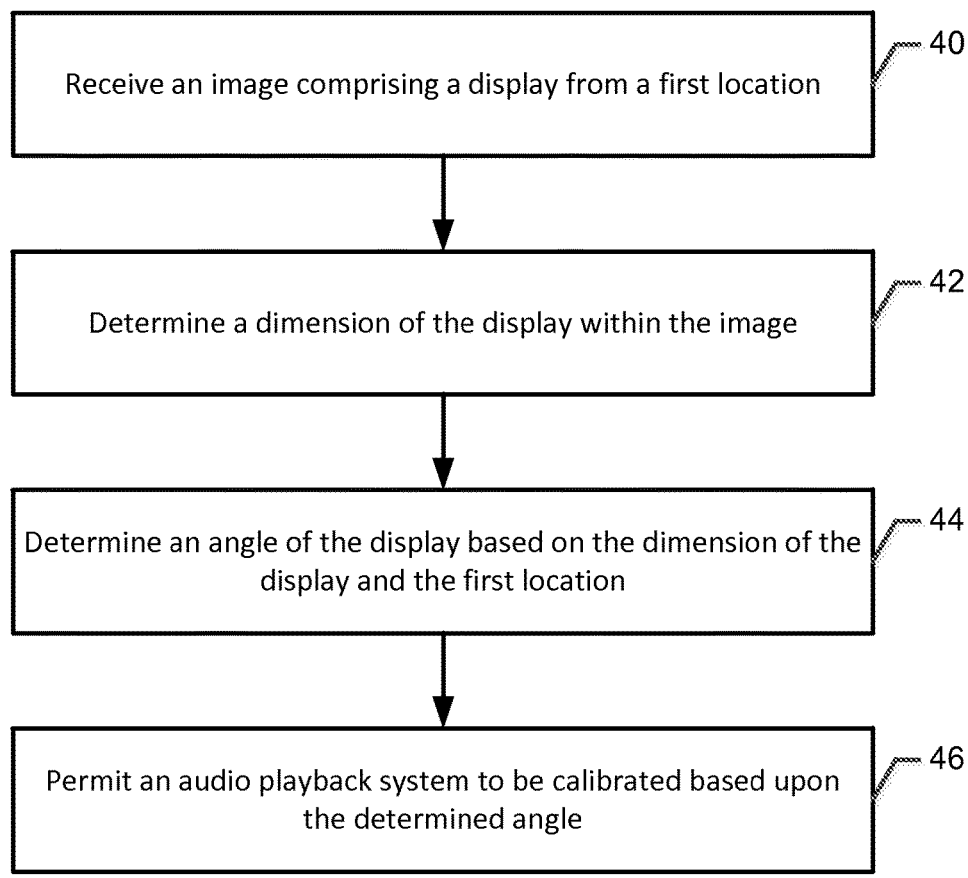
Figure 4:
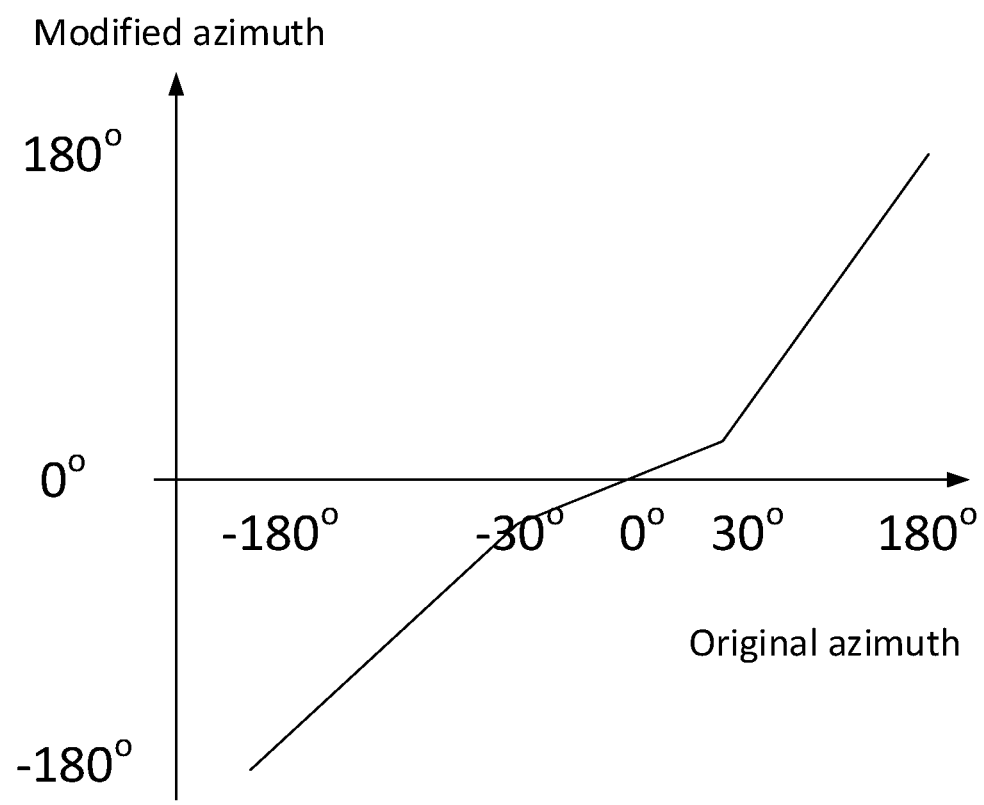
Figure 5:
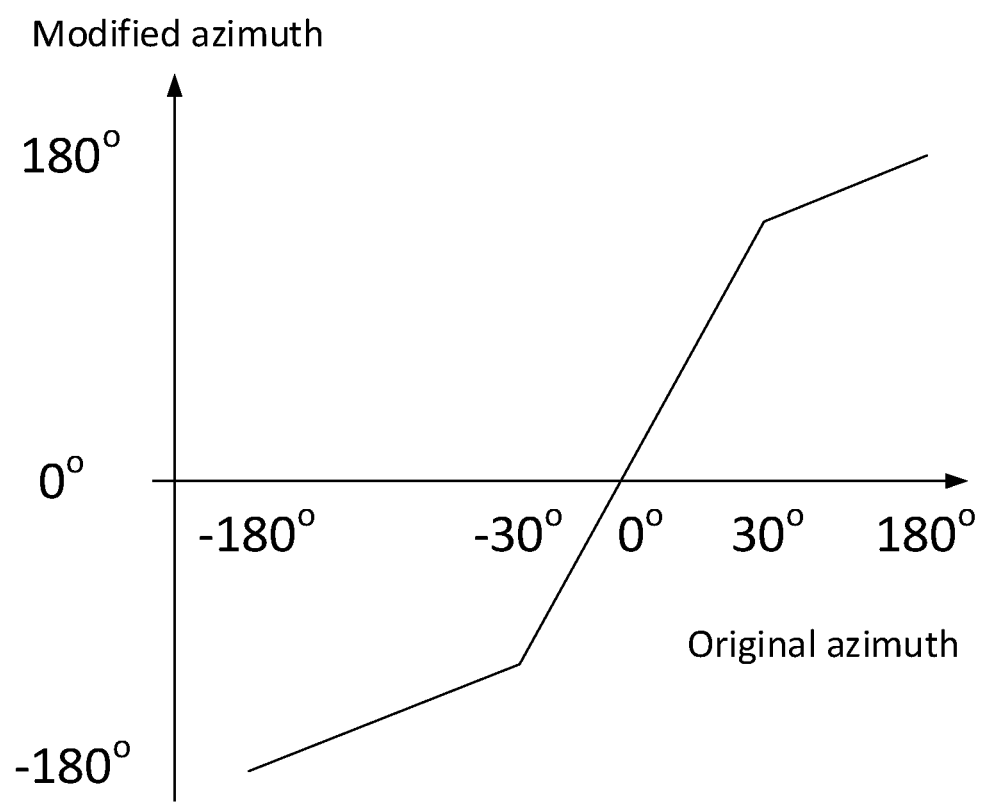
Figure 6A:
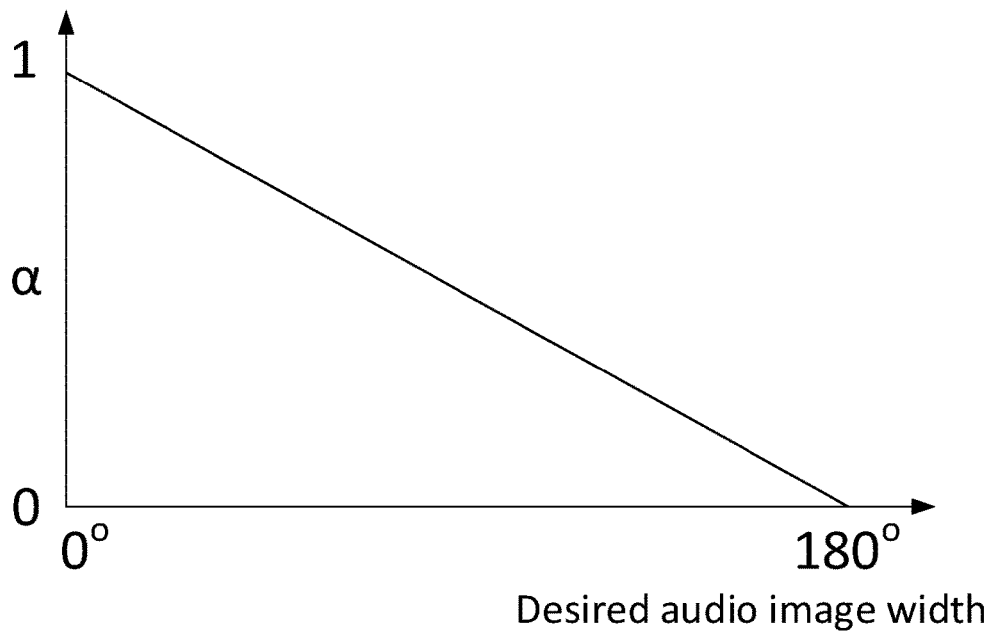
Figure 6B:
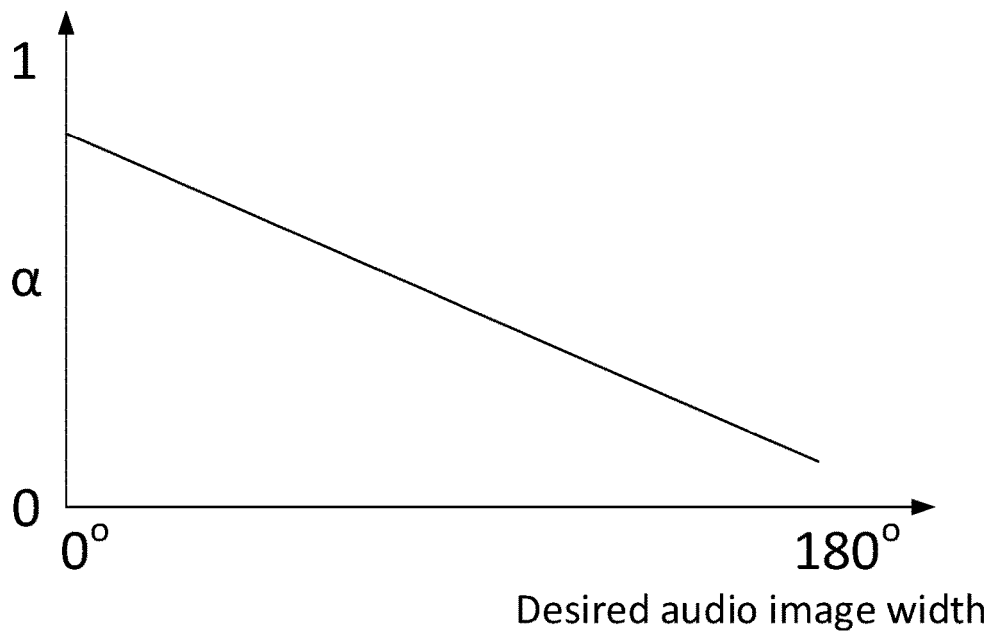
Figure 7:
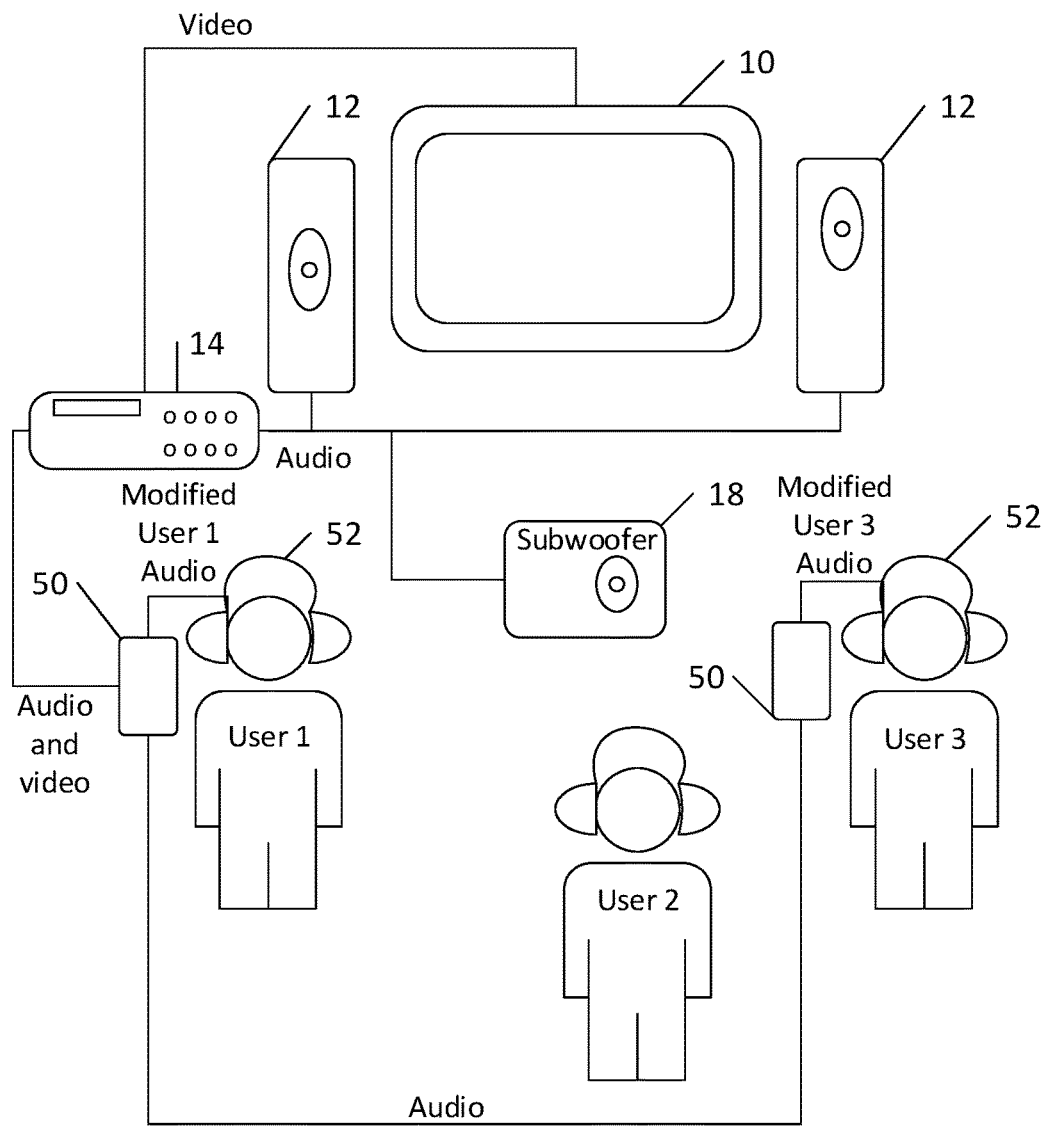
Figure 8:
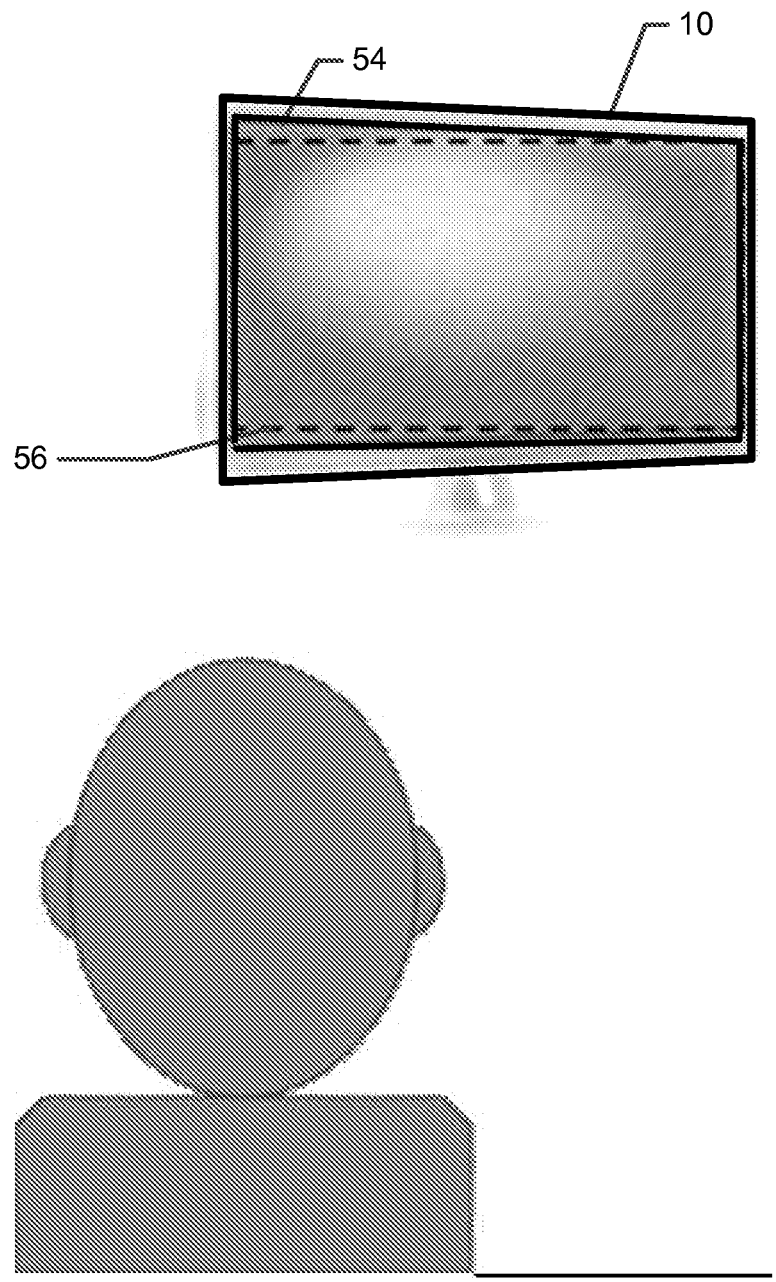
Figure 9:
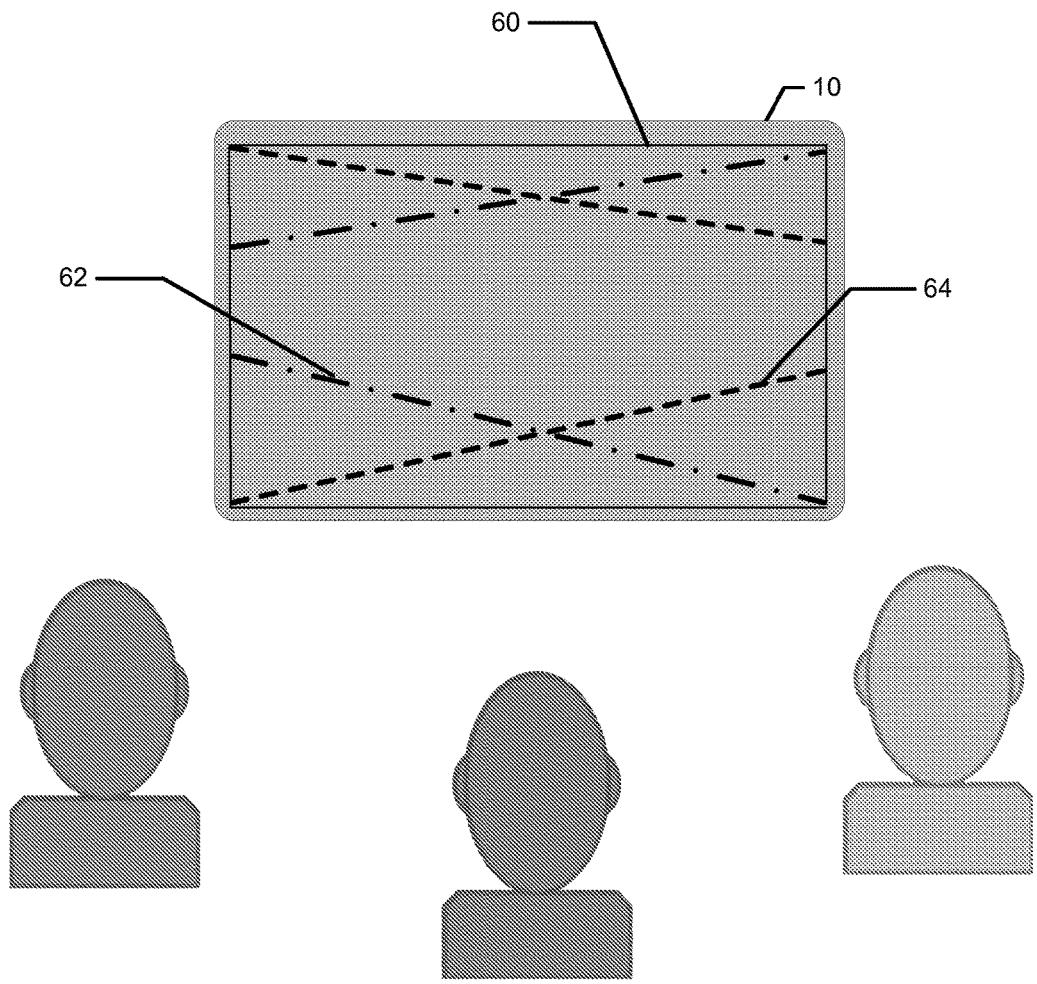
Figure 10:
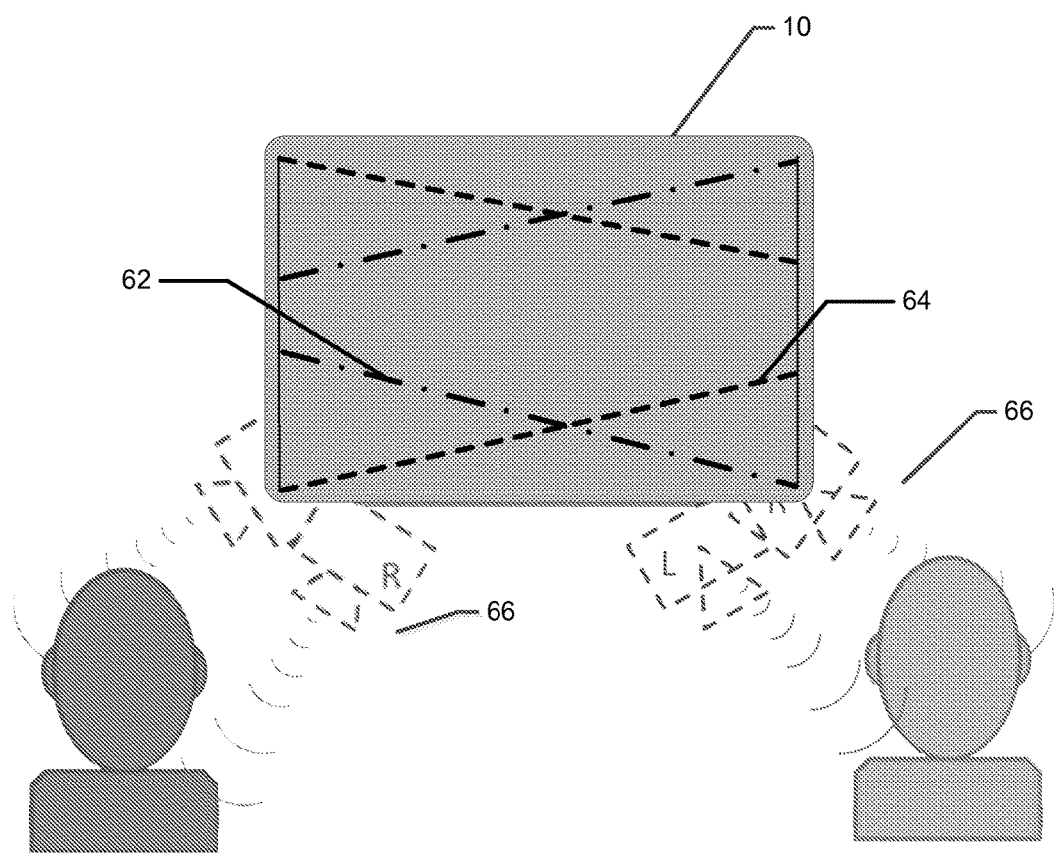
Figure 11:
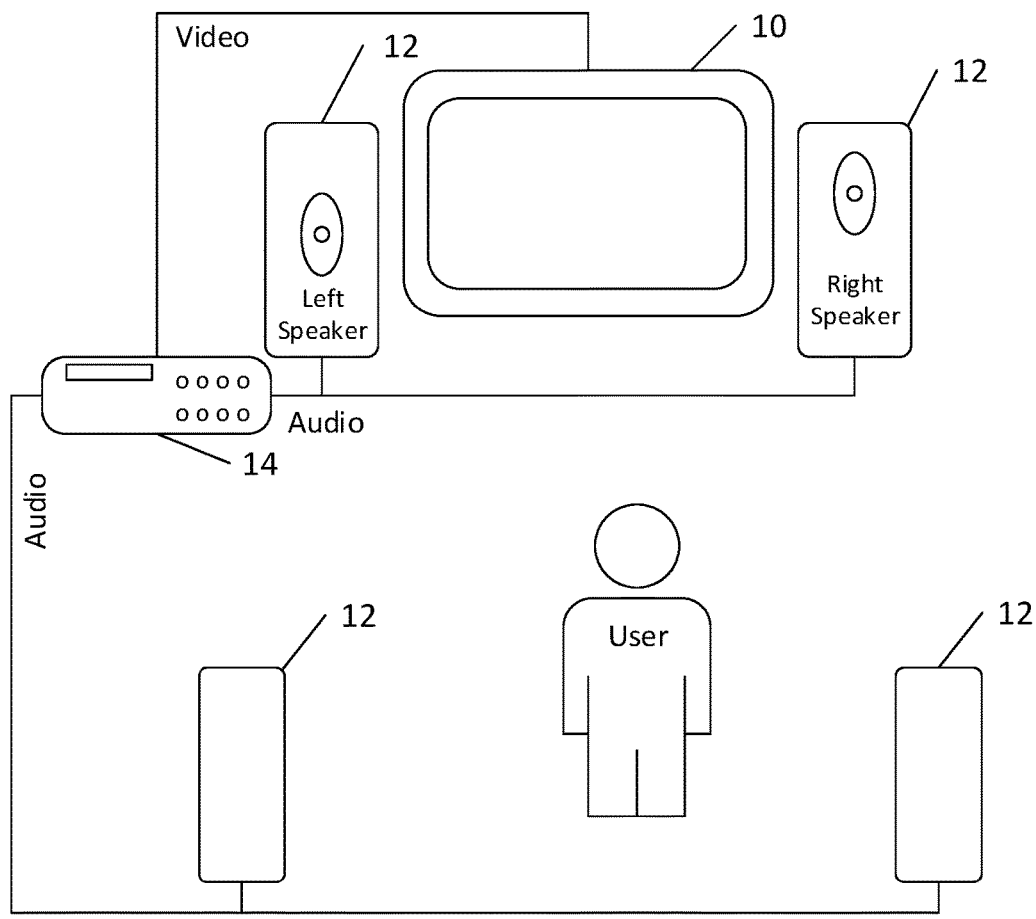

Having thus described certain example embodiments of the present invention in general terms, reference will now be made to the accompanying drawings, which are not necessarily drawn to scale, and wherein:

FIG. 1 is a schematic representation of a display and an audio playback system that may be calibrated in accordance with an example embodiment of the present invention based upon an angle of the display relative to a viewer;

FIG. 2 is an apparatus that may be specifically configured in accordance with an example embodiment of the present invention;

FIG. 3 is a flowchart illustrating operations performed, such as by a specifically configured apparatus of FIG. 2, in accordance with an example embodiment of the present invention;

FIGS. 4 and 5 are graphical representations of a relationship between the original azimuth and the modified azimuth for a narrower auditory image and a wider auditory image, respectively, utilized in conjunction with the modification of object oriented audio in accordance with an example embodiment of the present invention;

FIGS. 6A and 6B are graphical representations of a relationship between a desired audio image with and a parameter α utilized in conjunction with the modification of multichannel audio in accordance with an example embodiment of the present invention;

FIG. 7 is a schematic representation of a display and an audio playback system that may be calibrated in accordance with another example embodiment of the present invention based upon the locations of a plurality of viewers;

FIG. 8 is a schematic representation of the keystoning of a video presented upon a display based upon the location of a viewer and the modification of the video that may be provided by an example embodiment of the present invention in order to reduce the keystoning;

FIG. 9 is a schematic representation of the keystoning of a video presented upon a display for each of three differently positioned viewers and the modification of the video that may be provided in accordance with an example embodiment of the present invention in order to reduce the keystoning;

FIG. 10 is a schematic representation of a display and an audio playback system that may be calibrated so as to provide differently modified audio content for listeners at different locations relative to the display in accordance with an example embodiment of the present invention; and FIG. 11 is a schematic representation of a display and an audio playback system configured to be calibrated following detection of the speaker locations relative to the display in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

The method, apparatus and computer program product of an example embodiment provide for calibration of an audio playback system with a video to be presented upon a display. In this regard, the method, apparatus and computer program product of an example embodiment may be configured to calibrate the audio playback system based upon an angle at which a viewer views the display. As a result of the calibration, the spatial sound experience of the viewer may be enhanced, such as in instances in which the viewer is positioned off-center relative to the display and/or in instances in which the speakers of the audio playback system are positioned in different locations than those that are recommended for optimal performance.

Referring now to FIG. 1, a system that includes a display 10 and an audio playback system configured to be calibrated, such as with a video to be presented upon the display, in accordance with an example embodiment are depicted. The display may be any of a wide variety of displays including television screens, computer monitors, movie screens, projection screens or the like. As to the audio playback system, the audio playback system may include an audio/video (AV) receiver 12 and a plurality of speakers 14. The AV receiver is in communication with the plurality of speakers and the display, such as via either wireless or wire line communication. As such, the AV receiver is configured to provide video signals to the display and audio signals to the speakers.

The plurality of speakers 14 include at least two speakers with one speaker generally positioned to the left of the display 10 and another speaker generally positioned to the right of the display. As shown in FIG. 1, the plurality of speakers may also include a center speaker located generally coincident with the display and directed substantially orthogonally outward therefrom. The audio signals provided by the AV receiver 12 to the plurality of speakers may be multichannel audio signals, such as stereo, 5.1 or 7.1 multichannel audio signals. Alternatively, the plurality of speakers may include one or more additional speakers located rearward of the anticipated location of the viewer relative to the display, as shown in dashed lines in FIG. 1. For example, the plurality of speakers may include a left surround sound speaker positioned to the left of the display and behind the anticipated viewing location relative to the display and a right surround sound speaker positioned to the right of the display and behind the anticipated viewing location relative to the display. In this example embodiment, the audio signals provided by the AV receiver to the plurality of speakers may include surround sound audio signals, such as Dolby Atmos audio signals.

As shown in FIG. 1, the viewer may not always view the display 10 from a location centered in front of the display. Instead, the viewer may, at least sometimes, view the display from a location offset to the left or to the right relative to the display, such as to the left of the display in the example depicted in FIG. 1. In order to provide an improved spatial sound experience for the viewer in such an offset location, the method, apparatus and computer program product of an example embodiment may calibrate the audio playback system with the video that is presented upon the display based upon the viewing angle θ at which the viewer views the display.

In order to calibrate the audio playback system, an apparatus 20 is provided as shown in FIG. 2. The apparatus may be embodied in a variety of different devices including a mobile device 16 of the viewer, the audio playback system, such as the AV receiver 12, or another device, such as a computing device, e.g., a mobile device or a fixed computing device such as a desktop computer, a personal computer, a workstation or other non-mobile computing device, that is in communication with the audio playback system and the display. In an instance in which the apparatus is embodied by a mobile device of the user, the mobile device may include, for example, a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems.

Regardless of the manner in which the apparatus 20 is instantiated, the apparatus is specifically configured to perform the operations to calibrate an audio playback system with a video presented upon a display 10. As shown in FIG. 2, for example, the apparatus may include or otherwise be in communication with a processor 22, a memory device 24 and a communication interface 26. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device, an audio playback system or another computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In an embodiment in which the apparatus 20 is embodied by the audio playback system, the processor may be embodied by an audio processor.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of the illustrated embodiment also includes a communication interface 26 that may be any means such as a device or circuitry embodied in either hardware or a combination of hardware and software that is configured to receive and/or transmit data from/to a communications device in communication with the apparatus, such as to facilitate communications between a mobile device of the user and the audio playback system and/or another computing device. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

In some embodiments, such as embodiments in which the apparatus 20 is embodied by a mobile device 16, the apparatus may also include a user interface 28 that may be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In an example embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

In some embodiments, such as embodiments in which the apparatus 20 is embodied by a mobile device 16, the apparatus may further include a camera 30 that is in communication with the processor 22. The camera may be any means for capturing an image for storage, display or transmission including, for example, an imaging sensor. For example, the camera may include a digital camera including an imaging sensor capable of forming a digital image file from a captured image. As such, the camera may include all hardware, such as a lens, an imaging sensor and/or other optical device(s), and software necessary for creating a digital image file from a captured image. Alternatively, the camera may include only the hardware needed to view an image, while a memory device 24 of the mobile device stores instructions for execution by the processor in the form of software necessary to create a digital image file from a captured image. In an example embodiment, the camera may further include a processing element such as a coprocessor which assists the processor in processing image data and an encoder and/or decoder for compressing and/or decompressing image data. The encoder and/or decoder may encode and/or decode according to a predefined format, such as a JPEG standard format. The images that are captured may be stored for future viewings and/or manipulations in the memory of the mobile device and/or in a memory external to the mobile device, such as the memory of the audio playback system.

Referring now FIG. 3, the operations performed to calibrate an audio playback system with a video presented upon a display 10 in accordance with an example embodiment are depicted. As shown in block 40 of FIG. 3, the apparatus 20 may include means, such as the processor 22, the camera 30, the communications interface 26 or the like, for receiving an image comprising the display 10 from a first location. In this regard, the first location may be the anticipated viewing location, that is, the location from which the viewer will view the video presented upon the display 10.

In an embodiment in which the apparatus 20 is embodied by a mobile device 16 of the user, the image of the display 10 may be received by causing the camera 30 of the mobile device to capture the image comprising the display. In this regard, the user may hold the mobile device in front of them such that the camera is directed in the same direction in which the user is facing. As such, the field of view of the camera of the mobile device is the same as or at least comparable to the field of view of the user. The apparatus, such as the processor 22, may then direct the camera to capture an image, which includes the display. Alternatively, in an embodiment in which the apparatus is embodied by another device, such as the AV receiver 14, the image comprising the display from the first location may be captured by the mobile device and may then be provided to the apparatus, such as via a wireless communications link, e.g., via a Bluetooth link, a near-field communications (NFC) link or other proximity-based wireless communications link. Thus, the apparatus of this embodiment may receive the image comprising the display from the first location by receiving the image captured by the mobile device.

In order to calibrate the audio playback system, the apparatus 20, such as the processor 22, identifies the display 10 within the image. In instances in which the apparatus, such as the processor, is providing or otherwise aware of the video that is presented upon the display, the apparatus, such as the processor, may identify the display based upon the video that is presented thereupon. In instances in which the apparatus, such as the processor, is unaware of the video presented upon the display or in instances in which no video is yet presented upon the display, the display may still be readily identified within many images since the display will be the only object in the image having a polygonal shape. However, in some instances, the apparatus, such as the processor, may identify the display at least partially based upon additional information that is provided in conjunction with the image comprising the display. This additional information may facilitate the identification of the display within the image in instances, for example, in which a picture is placed above the display such that it might otherwise be difficult to distinguish the display from the picture.

For example, the user who is capturing the image comprising the display 10 with the camera 30 may explicitly identify the display within the image, such as by associating a tag or other form of identification with the display. As another example, the user may be instructed to position the display within the center of the image, thereby facilitating subsequent identification of the display within the image. In this regard, the camera may be configured to present a frame or an outline in a predefined, e.g., central, portion of the viewfinder and the user may be instructed to position the camera such that the display located within the frame. Still further, the apparatus 20, such as the processor 22, may be configured to identify the display within the image based upon characteristics of the video presented upon the display, such as the light level and/or the color gamut of the video relative to the surroundings, the screen refresh rate or the like, that serve to distinguish the video and, therefore, the display from other objects, e.g., pictures, digital picture frames, etc., within the image.

As shown in block 42 of FIG. 3, the apparatus 20 may also include means, such as the processor 22 or the like, for determining a dimension of the display 10 within the image. The apparatus, such as the processor, may be configured to determine various dimensions of the display, but, in one example embodiment, is configured to determine a width of the display. In this regard, the apparatus, such as the processor, may determine the width of the display in terms of the number of pixels of the image that correspond to the width of the display. Since the width of the display in the image that has been captured from the first location is dependent upon the angle at which the display is viewed, the apparatus may also include means, such as the processor or the like, for determining the angle of the display based upon the dimension, such as the width, of the display as determined within the image and the first location from which the image of the display is captured. See block 44 of FIG. 3. While the angle of the display may be determined in various manners, the angle of the display may be determined by the apparatus, such as the processor, as follows:

$$\alpha = 2\arctan\left(\frac{d \frac{tv\_image\_width}{picture\_width}}{2f}\right)$$

wherein d is the width in millimeters of the imaging sensor of the mobile device, display_image_width is the number of pixels of the image that correspond to the width of the display, picture_width is the total width in pixels of the image captured by the mobile device and f is the focal length of the camera in millimeters. For example, in an instance in which the mobile device is a Nokia 808 PureView smartphone having a 1/1.2 inch imaging sensor with a width of 10.67 millimeters and a focal length of 8.02 millimeters, the angle of the display from the first location may be about 25° in an instance in which the image has a size of 3,000×2,000 pixels and the width of the display corresponds to 1000 pixels of the image as determined in accordance with the following:

$$\alpha = 2\arctan\left(\frac{10.67 \text{ mm} * \frac{1000}{3000}}{2 * 8.02 \text{ mm}}\right) \approx 25°$$

Based upon the configuration of the speakers 12, a recommended viewing angle from which the display 10 is to be viewed so as to enjoy the desired spatial sound experience may be predefined. For example, in an instance in which the left and right speakers are 60° from one another, the recommended viewing angle may be 40°. In an instance in which the viewer is not located at the recommended viewing angle with respect to the display, it may be desirable to alter the perceived audio image so as to improve the spatial sound experience of the viewer. For example, if the viewing angle is smaller than 40°, it would be desirable for the perceived audio image from the left and right speakers to be made narrower and if the viewing angle is greater than 40°, it would be desirable for the perceived audio image from the left and right speakers to be made wider.

As such, the apparatus 20 may also include means, such as the processor 22, the communication interface 26 or the like, for permitting the audio playback system associated with the display 10 to be calibrated, such as with the video to be presented upon the display, based upon the determined angle. See block 46 of FIG. 3. In an example embodiment in which the apparatus is embodied by a mobile device 16, the apparatus, such as the processor, may permit the audio playback system to be calibrated by determining the manner in which the audio signals should be modified and then providing direction to the audio playback system, such as the AV receiver 14, regarding the manner in which the audio signals should be modified. Alternatively, in the example embodiment in which the apparatus is embodied by the mobile device, the apparatus, such as the processor, may permit the audio playback system to be calibrated by providing the angle of the display to the audio playback system, such as the AV receiver, which may thereafter determine the manner in which the audio signals are to be modified based upon the angle. Still further, in an example embodiment in which the apparatus is embodied by another device, such as the audio playback system, e.g., the AV receiver, the apparatus, such as the processor, may permit the audio playback system to receive the image or the angle from the mobile device and to then be calibrated by determining the manner in which the audio signals are to be modified based upon the angle from the first location.

The manner in which the audio signals are modified based upon the angle from which the display 10 is viewed, may be performed in various manners. By way of example, in an instance in which the audio signals are object oriented, such as Dolby Atmos audio signals, the azimuth of the audio objects may be modified so as to enhance the spatial sound experience. In this regard, object-oriented audio signals include audio objects with trajectories. The trajectories may be expressed in terms of azimuth and elevation. In order to cause the audio image around the display to be wider or narrower, the apparatus 20, such as the processor 22, may be configured to modify the azimuth value dependent upon the viewing angle. In this regard, the azimuth values of the audio signals may be modified as shown in FIG. 4 in an instance in which the audio image is to be made narrower, such as in an instance in which the angle is smaller than the recommended viewing angle, and in accordance with FIG. 5 in an instance in which the audio image is to be widened, such as in an instance in which the angle is greater than the recommended viewing angle. As FIGS. 4 and 5 depict, the modified azimuth values of the audio signals depend not only upon the desired narrowing or broadening of the audio image, but also upon the original azimuth value of the audio signals. In an instance in which the audio signals include auditory objects that contain speech as well as auditory objects that include music, the apparatus, such as the processor, may be configured to only modify the audio objects that include speech without modifying the audio objects that include music, such that music playback is not affected. In another example embodiment, signals other than speech may be modified if those signals are related to a visual event on the display, while signals other than music may be left unmodified, if those signals are not related to a visual event on the display. As such, the method and apparatus of an example embodiment may selectively modify different types of signals in different manners depending upon their relationship to video presented upon the display.

Alternatively, in an embodiment in which the audio signals are multichannel audio signals, such as stereo audio signals, 5.1 audio signals or 7.1 audio signals, the apparatus 20, such as the processor 22, may modify the audio signals by modifying the audio channels to make the auditory image wider or narrower depending upon the angle at which the display 10 is viewed. The modification of the audio channels may be performed in various manners, but, in an example embodiment, the apparatus, such as the processor, is configured to modify the audio channels of the multichannel audio signals by modifying the left (L) and right (R) channels. In this regard, the apparatus, such as the processor, may be configured to convert the L and R channels into mid (M) and side (S) channels, such as in accordance with the following:

$$M=L+R, \ S=L-R$$

In this example embodiment, the apparatus 20, such as the processor 22, may be configured to control the audio image by modifying the mid and side channels with a parameter alpha $\alpha$ as follows:

$$\hat{M}=\alpha M, \ \hat{S}=(1-\alpha)S$$

The apparatus 20, such as the processor 22, of this example embodiment, may be configured to determine the value of $\alpha$, such as based upon a predefined relationship between the desired audio image width and the value of the parameter $\alpha$, such as shown in FIG. 6A in which $\alpha$ ranges from 0 to 1 or alternatively in FIG. 6B in which $\alpha$ is limited so as to be greater than 0 and less than 1. Thereafter, the modified L and R channels may be defined by the apparatus, such as the processor, based upon the modified M and S channels, such as shown below:

$$L=\hat{M}+\hat{S}, \ L=\hat{M}-\hat{S}$$

Some audio signals are more complex. For example, the audio signals associated with some games may include both sound objects and stereo or other multichannel sounds. In this example embodiment, the sound objects may be modified as described in conjunction with object-oriented audio signals, while the stereo or multichannel sounds may be modified as described above in conjunction with multichannel audio signals. By separately modifying the sound objects and the stereo or multichannel sounds based upon the angle of the viewer relative to the display, the resulting modified audio signals may be summed together prior to being played back for the viewer.

The viewing angle may also vary based upon the size of the display 10. For example, for a user positioned at the same location relative to the display, the viewing angle of a smaller display, e.g., a 15 inch display, is smaller than the viewing angle of a larger display, e.g., a 42 inch display. Moreover, in an instance in which a video presented upon the display includes a person or other source of audio signals that is positioned near the left or right edge of the display, the size of the display will also impact the perceived location of the audio signals with the audio signals appearing to come from a location further offset from the center of a larger display than a smaller display. As described above, however, the audio signals may be modified so as to take into account differences in the viewing angle including those attributable to a differently sized display.

In some instances, the display 10 may be concurrently viewed by a plurality of viewers who may be at different locations relative to the display. In this situation, the angle from which each viewer views the display may be determined, such as based upon an image captured by a respective mobile device 16 of each viewer. In an example embodiment, the apparatus 20, such as the processor 22, may be configured to determine an average of the angles from which the plurality of viewers view the display. In this example embodiment, the calibration of the audio playback system may then be performed based upon the average viewing angle of the plurality of viewers.

An example of multiple viewers of a display 10 is shown in FIG. 7. In this example embodiment, the apparatus 20 may be embodied by the mobile devices 16 of each viewer. As such, the mobile device, such as the camera 30, of each viewer may capture an image comprising the display from the location of the respective viewer. The apparatus, such as the processor 22, may then determine the angle of display for the respective viewer and, upon receipt of the audio signals from the AV receiver 14, may cause the audio signals to be calibrated, such as by being modified based upon the angle at which the respective viewer views the display, prior to being output to the viewer via the speakers within the headphones 52.

Subwoofer audio signals may be relatively poorly represented by headphones 52. As such, subwoofer audio signals may continue to be provided by a subwoofer 18 as shown in FIG. 7 since humans are relatively insensitive to the direction of low frequency sounds. If the headphones have active noise cancellation, the apparatus 20, such as the processor 22, may deactivate the active noise cancellation for low frequencies, such as frequencies below a predefined frequency level, e.g., a frequency level that defines the upper end of the subwoofer signals, in order to allow subwoofer signals to pass. Headphones that do not include active noise cancellation will naturally allow low frequency signals to pass to a greater degree than high frequency signals. As shown in FIG. 7, the viewers may include not only viewers wearing headphones via which the audio signals may be independently modified or calibrated, but also a viewer who does not wear headphones. The viewer who does not wear headphones therefore receives the audio signals from the left and right speakers 12 and the subwoofer with the audio signals having been modified in the manner described above in conjunction with FIG. 1.

In instances, such as described above in conjunction with the embodiment of FIG. 7, in which the audio signals are individually modified for each of a plurality of viewers, the apparatus 20, such as the processor 22, may also be configured to take into account personal settings of a respective viewer, such as personal settings for audio dynamic range compression and frequency equalization, such as may be provided by viewers having hearing loss. As such, the calibration of the audio playback system may include further modification of the audio signals based upon the personal settings of a respective viewer.

Although described above in conjunction with an apparatus 20 embodied by a mobile device 16 of the respective viewers, the apparatus of this example embodiment may also be embodied in other devices including the audio playback system, e.g., the AV receiver 14, such that audio signals may be individually modified for each viewer and may then be specifically provided to the headphones 52 of each respective user.

In another example embodiment, a viewer may watch a video upon the display of their mobile device 16. In this example embodiment, the display 10 is therefore the display of the mobile device and the angle at which the viewer views the display is dependent upon the distance at which the viewer holds the mobile device from their eyes. In this example embodiment, the method, apparatus and computer program product may calibrate the audio playback system, such as by matching the width of the stereo image of the audio signals to the width of the video.

The width of the display 10 may again be determined, such as based upon a predefined value stored by the memory device 24. The apparatus 20 of this example embodiment may also include means, such as the processor 22, the camera 30, the communications interface 26, or the like, for determining the distance between the eyes of the viewer. For example, an image of the viewer may be captured by the camera of the mobile device and the distance between the eyes of the viewer as measured in terms of pixels within the image of the viewer may be determined. The apparatus, such as the processor, of this example embodiment may then be configured to determine the angle at which the viewer views the video upon the display, such as in accordance with the following:

$$\alpha = 2\arctan\left(\frac{d \cdot \text{display\_width} \cdot \text{detected\_eye\_distance}}{2 \cdot \text{average\_eye\_distance} \cdot f \cdot \text{picture\_width}}\right)$$

wherein d is the width of the imaging sensor, such as 10.67 mm for a Nokia 808 PureView smartphone having a 1/1.2 inch sensor, detected_eye_distance is the number of pixels that the eyes of the viewer are separated in the image captured by the camera of the mobile device, picture_width is the total width of the image captured by the camera of the mobile device in terms of pixels, f is the focal length of the camera of the mobile device and average_eye_distance is the distance at which the viewer holds the mobile device from their eyes. In this regard, the average_eye_distance is typically between 50 and 70 millimeters and, in an example embodiment, may be represented by an average value, such as 63 millimeters. However, the average_eye_distance may be any one of a plurality of predefined values with a different predefined value established for different age ranges of viewers.

Following determination of the angle at which the viewer views the display of their mobile device, the method, apparatus and computer program product of this example embodiment may calibrate the audio playback system, such as by modifying the audio signals, e.g., modifying the width of the audio image, as described above.

In an instance in which a viewer is positioned offset to the left or right of the display 10, the image presented by the display may appear to be distorted, such as due to keystoning. As shown n FIG. 8, for example, a viewer located to the left of the display may view an angle that causes the video presented by the display to exhibit keystoning as depicted by the solid line 54. As a result of the image comprising the display that is received in accordance with an example embodiment of the present invention, the apparatus 20 may include means, such as the processor 22 or the like, for determining information regarding keystoning from the image comprising the display. For example, the apparatus, such as the processor, may determine the extent or amount of keystoning, that is, the amount by which the image appears to the viewer to differ from a rectangular image. The apparatus of this example embodiment may include means, such as the processor or the like, for modifying the video presented upon the display so as to reduce the keystoning, such as by causing a perspective image to be presented that appears substantially rectangular to the viewer as represented by the dashed outline 56 in FIG. 8.

In an instance in which multiple viewers are concurrently viewing the display 10, an image comprising the display may be captured from the location of each viewer. The apparatus 20, such as the processor 22, of an example embodiment may then determine the modification of the video to be made for each viewer in order to reduce the keystoning. For example, the apparatus, such as the processor, may be configured to determine the average modification to be made to the video to reduce the keystoning based upon an average of the individual modifications to the video that are determined for each viewer's location. Alternatively, the display may be a multi-view display that is configured to provide independent images in each of a plurality of different directions. In this example embodiment, the images presented by the display and directed in the different directions may be individually modified to reduce keystoning in the manner described above in conjunction with FIG. 8. As shown in FIG. 9, for example, the image having a solid outline 60 may be directed to a viewer located directly in front of the display with perspective and keystone-corrected images shown by dashed outlines 62 and 64 being directed to viewers on the left and right, respectively, of the display.

As described above, the apparatus 20 may be configured to modify not only video for each of a plurality of viewers depending upon the respective locations of the viewers relative to the display 10, but may also be configured to correspondingly modify audio signals for each of a plurality of viewers based upon the respective locations of the viewers, such as in an instance in which the viewers are wearing headphones 52 as shown in FIG. 7. In an embodiment in which the viewers are not wearing headphones, however, the audio playback system may include highly directive speakers 66, such as the Audio Spotlight® system provided by Holosonics Research Labs, Inc., as shown in FIG. 10. In this example embodiment, the audio playback system may be calibrated in accordance with an example embodiment such that differently modified audio signals may be directed to different ones of the highly directive speakers depending upon the relative location of the viewers with respect to the display with the modification of the audio signals being determined by the angle of the display from the different viewer locations as described above.

A technique has been proposed to modify the audio image presented to a user in order to improve the spatial sound experience. In this technique, a user may position a mobile device, such as a mobile telephone with multiple microphones, in a desired listening location, such as centered in front of a display 10. The audio playback system may then cause audio signals to be sequentially provided via the different speakers 12. These audio signals are captured by the microphones of the mobile device and analyzed in order to determine the direction of each speaker form the desired listening location and, in some instances, the distance between each speaker and the desired listening location. To properly determine the direction and/or distance to each speaker, the mobile device was required to be positioned in the desired listening location, such as centered in front of the display. However, the method, apparatus 20 and computer program product of an example embodiment may permit the mobile device to be positioned at other locations relative to the display, such as offset to the left or to the right of the display. Based upon the image comprising the display captured by the camera 30 of the mobile device and the subsequent determination of the angle of the display, the apparatus, such as the processor 22, may be configured to determine the center of the display. As such, the audio playback system may modify the audio image relative to the center of the display regardless of the location of the mobile device. Additionally, by determining the locations of the speakers as well as the first location of the viewer relative to the display, such as in the manner described above, the apparatus, such as the processor, of an example embodiment may be configured to modify the audio image in a more precise manner based upon the locations of the speakers as well as the first location of the viewer relative to the display.

As described above, a method, apparatus 20 and computer program product are provided in accordance with an example embodiment in order to facilitate calibration of an audio playback system with a video presented upon a display 10, thereby permitting the spatial sound experience to be enhanced. Additionally, the method, apparatus and computer program product of some example embodiments may reduce keystoning and other distortions, thereby further improving the user experience. By calibrating the audio playback system with the video presented upon the display, the method, apparatus and computer program product of an example embodiment may permit increased flexibility with respect to the relative locations of the speakers 12 with respect to the display and with respect to the location of the viewer relative to the display, while continuing to provide the desired spatial sound experience.

As described above, FIG. 3 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving information about a display, wherein the received information comprises an image captured by a camera of a device at a first location, wherein the first location is a viewing position from which a viewer views a video on the display;
determining an angle of the display relative to the first location based upon the received information about the display and the first location; and
causing an audio playback system associated with the display to be calibrated with a modified azimuth of at least one object oriented audio signal, wherein orientation of the at least one object oriented audio signal is aligned based upon the determined angle.

2. A method according to claim 1 further comprising determining the modified azimuth for the at least one object oriented audio signal that contains speech.

3. A method according to claim 1 wherein causing the audio playback system to be calibrated comprises converting left and right channels of multichannel audio into mid and side channels, modifying the mid and side channels based upon a target audio image width and converting the mid and side channels, as modified, to left and right channels of the multichannel audio.

4. A method according to claim 3 wherein the target audio image width changes in response to at least the modified azimuth of the at least one object oriented audio signal.

5. A method according to claim 1 wherein causing the audio playback system to be calibrated comprises causing the modified azimuth to be provided to an audio processor of the audio playback system to calibrate audio.

6. A method according to claim 1 further comprising determining a center of the display based upon the received information about the display.

7. A method according to claim 1 wherein causing the audio playback system to be calibrated comprises determining a measure of calibration and causing the measure of calibration to be provided to an remote audio processor of the audio playback system.

8. A method according to claim 1 further comprising determining information regarding keystoning from the captured image and causing the information regarding keystoning to be provided so as to permit modification of a video presented upon the display to reduce the keystoning.

9. An apparatus comprising:
at least one processor; and
at least one memory communicatively coupled to the at least one processor, wherein the at least one memory includes computer program code that when executed by the at least one processor, is configured to cause the apparatus to at least:
receive information about a display, wherein the received information comprises an image captured by a camera of a device at a first location, wherein the first location is a viewing position from which a viewer views a video on the display;
determine an angle of the display relative to the first location based upon the received information about the display and the first location; and
cause an audio playback system associated with the display to be calibrated with a modified azimuth of at least one object oriented audio signal, wherein orientation of the at least one object oriented audio signal is aligned based upon the determined angle.

10. An apparatus according to claim 9 wherein the computer program code, when executed by the at least one processor, is configured to cause the apparatus to determine the modified azimuth for the at least one object oriented audio signal that contains speech.

11. An apparatus according to claim 9 wherein the computer program code, when executed by the at least one processor, is configured to cause the apparatus to convert left and right channels of multichannel audio into mid and side channels, modify the mid and side channels based upon a target audio image width and convert the mid and side channels, as modified, to left and right channels of the multichannel audio.

12. An apparatus according to claim 9 wherein the target audio image width changes in response to at least the modified azimuth of the at least one object oriented audio signal.

13. An apparatus according to claim 9 wherein the computer program code, when executed by the at least one processor, is configured to cause the apparatus to cause the audio playback system to be calibrated by causing the modified azimuth to be provided to an audio processor of the audio playback system to calibrate audio.

14. An apparatus according to claim 9 wherein the computer program code, when executed by the at least one processor, is configured to cause the apparatus to cause the audio playback system to be calibrated by determining a measure of calibration and causing the measure of calibration to be provided to an audio processor of the audio playback system.

15. A computer program product comprising at least one non-transitory computer-readable storage medium having computer-executable program code portions stored therein, the computer-executable program code portions comprising program code instructions for:

receiving information about a display, wherein the received information comprises an image captured by a camera of a device at a first location, wherein the first location is a viewing position from which a viewer views a video on the display;

determining an angle of the display relative to the first location based upon the received information about the display and the first location; and causing an audio playback system associated with the display to be calibrated with a modified azimuth of at least one object oriented audio signal, wherein orientation of the at least one object oriented audio signal is aligned based upon the determined angle.

16. A computer program product according to claim 15 wherein the computer-executable program code portions further comprise program code instructions for determining the modified azimuth for the at least one object oriented audio signal that contains speech.

17. A computer program product according to claim 15 wherein the program code instructions for causing the audio playback system to be calibrated comprise program code instructions for converting left and right channels of multichannel audio into mid and side channels, program code instructions for modifying the mid and side channels based upon a target audio image width and program code instructions for converting the mid and side channels, as modified, to left and right channels of the multichannel audio.

18. A computer program product according to claim 15 wherein the program code instructions for causing the audio playback system to be calibrated comprise program code instructions for causing the modified azimuth to be provided to an audio processor of the audio playback system to calibrate audio.

* * * * *